(12) United States Patent
Hoerl et al.

(10) Patent No.: US 8,281,040 B2
(45) Date of Patent: *Oct. 2, 2012

(54) WIRELESS MANAGEMENT OF REMOTE DEVICES

(75) Inventors: David Hoerl, Bridgewater, NJ (US); John T. Burgess, Pittstown, NJ (US)

(73) Assignee: RIP, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/881,255

(22) Filed: Sep. 14, 2010

(65) Prior Publication Data

US 2010/0332580 A1 Dec. 30, 2010

Related U.S. Application Data

(63) Continuation of application No. 10/988,184, filed on Nov. 12, 2004, now Pat. No. 7,818,480, which is a continuation-in-part of application No. 10/799,349, filed on Mar. 12, 2004, which is a continuation-in-part of application No. 10/233,299, filed on Aug. 29, 2002, now Pat. No. 7,684,483.

(51) Int. Cl.
  *G06F 13/12* (2006.01)
  *G06F 15/16* (2006.01)
(52) U.S. Cl. .............. 710/2; 710/64; 710/104; 709/251; 345/506
(58) Field of Classification Search .................. 710/62, 710/64, 104; 709/223, 251; 345/506
See application file for complete search history.

(56) References Cited

U.S. PATENT DOCUMENTS

| | | |
|---|---|---|
| 4,698,672 A | 10/1987 | Chen et al. |
| 4,771,865 A | 9/1988 | Hinderling |
| 5,008,747 A | 4/1991 | Carr et al. |
| 5,483,634 A | 1/1996 | Hasegawa |
| 5,552,832 A | 9/1996 | Astle |
| 5,576,845 A | 11/1996 | Komatsu |
| 5,721,842 A | 2/1998 | Beasley et al. |
| 5,732,212 A | 3/1998 | Perholtz et al. |
| 5,742,274 A | 4/1998 | Henry et al. |
| 5,757,424 A | 5/1998 | Frederick |
| 5,767,897 A | 6/1998 | Howell |
| 5,802,213 A | 9/1998 | Gardos |
| 5,821,986 A | 10/1998 | Yuan et al. |
| 5,861,960 A | 1/1999 | Suzuki et al. |
| 5,884,096 A | 3/1999 | Beasley et al. |
| 5,937,176 A | 8/1999 | Beasley et al. |
| 6,016,166 A | 1/2000 | Huang et al. |
| 6,091,857 A | 7/2000 | Shaw et al. |
| 6,112,264 A | 8/2000 | Beasley et al. |

(Continued)

OTHER PUBLICATIONS

Adder, Products Brochure, APX 304572-304579, Apr. 1, 1998, 8 pages.

(Continued)

*Primary Examiner* — Ernest Unelus

(57) ABSTRACT

Disclosed is a wireless remote network management system for interfacing a series of remote devices (e.g., computers, servers, networking equipment, etc.) to one or more user workstations. The system is multifunctional to allow multiple users to control remote devices through serial access or keyboard, video, and cursor control device access via wireless and hard-wired connections. The remote devices are preferably coupled to a wireless-enabled remote management unit through a chain of computer interface modules, and each user workstation includes a wireless user station coupled to a keyboard, a video monitor and a cursor control device. The remote management unit and user stations preferably communicate via a wireless network, which enables a user workstation to access, monitor and control any of the remote devices.

27 Claims, 8 Drawing Sheets

U.S. PATENT DOCUMENTS

| | | | |
|---|---|---|---|
| 6,167,432 | A | 12/2000 | Jiang |
| 6,173,082 | B1 | 1/2001 | Ishida et al. |
| 6,252,884 | B1 | 6/2001 | Hunter |
| 6,263,365 | B1 | 7/2001 | Scherpbier |
| 6,289,378 | B1 | 9/2001 | Meyer et al. |
| 6,304,895 | B1 | 10/2001 | Schneider et al. |
| 6,330,595 | B1 | 12/2001 | Ullman et al. |
| 6,333,750 | B1 | 12/2001 | Odryna et al. |
| 6,343,313 | B1 | 1/2002 | Salesky et al. |
| 6,345,323 | B1 | 2/2002 | Beasley et al. |
| 6,363,062 | B1 | 3/2002 | Aaronson |
| 6,373,850 | B1 | 4/2002 | Lecourtier et al. |
| 6,378,014 | B1 | 4/2002 | Shirley |
| 6,388,658 | B1 | 5/2002 | Ahern et al. |
| 6,408,334 | B1 | 6/2002 | Bassman et al. |
| 6,445,818 | B1 | 9/2002 | Kim |
| 6,532,218 | B1 | 3/2003 | Shaffer et al. |
| 6,535,983 | B1 | 3/2003 | McCormack |
| 6,539,418 | B2 | 3/2003 | Schneider et al. |
| 6,564,380 | B1 | 5/2003 | Murphy |
| 6,567,813 | B1 | 5/2003 | Zhu et al. |
| 6,567,869 | B2 | 5/2003 | Shirley |
| 6,571,016 | B1 | 5/2003 | Mehrotra et al. |
| 6,621,413 | B1 | 9/2003 | Roman et al. |
| 6,622,018 | B1 | 9/2003 | Erekson |
| 6,664,969 | B1 | 12/2003 | Emerson |
| 6,675,174 | B1 | 1/2004 | Bolle |
| 6,681,250 | B1 | 1/2004 | Thomas et al. |
| 6,701,380 | B2 | 3/2004 | Schneider et al. |
| 6,728,753 | B1 | 4/2004 | Parasnis et al. |
| 6,771,213 | B2 | 8/2004 | Durst et al. |
| 6,772,169 | B2 | 8/2004 | Kaplan |
| 6,850,502 | B1 | 2/2005 | Kagan |
| 6,952,495 | B1 | 10/2005 | Lee |
| 7,024,474 | B2 | 4/2006 | Clubb |
| 7,042,587 | B2 | 5/2006 | Fiske |
| 7,099,934 | B1 | 8/2006 | Ewing et al. |
| 7,117,266 | B2 | 10/2006 | Fishman et al. |
| 7,127,619 | B2 | 10/2006 | Unger et al. |
| 7,206,940 | B2 | 4/2007 | Evans et al. |
| 7,249,167 | B1 | 7/2007 | Liaw |
| 7,260,624 | B2 | 8/2007 | Sivertsen |
| 7,342,895 | B2 | 3/2008 | Serpa |
| 7,382,397 | B2 | 6/2008 | Mottur |
| 7,502,884 | B1 | 3/2009 | Shah |
| 7,576,770 | B2 | 8/2009 | Metzger et al. |
| 7,827,258 | B1* | 11/2010 | Kalbarga ............... 709/223 |
| 7,853,740 | B2* | 12/2010 | Liaw et al. ............... 710/62 |
| 2002/0018124 | A1 | 2/2002 | Mottur |
| 2002/0038334 | A1 | 3/2002 | Schneider et al. |
| 2002/0095594 | A1 | 7/2002 | Dellmo |
| 2002/0128041 | A1 | 9/2002 | Parry |
| 2002/0147840 | A1 | 10/2002 | Mutton et al. |
| 2002/0188709 | A1* | 12/2002 | McGraw et al. ............... 709/223 |
| 2003/0017826 | A1 | 1/2003 | Fishman et al. |
| 2003/0030660 | A1 | 2/2003 | Dischert et al. |
| 2003/0037130 | A1 | 2/2003 | Rollins |
| 2003/0088655 | A1* | 5/2003 | Leigh et al. ............... 709/223 |
| 2003/0092437 | A1 | 5/2003 | Nowlin et al. |
| 2003/0112467 | A1 | 6/2003 | McCollum et al. |
| 2003/0135656 | A1 | 7/2003 | Schneider |
| 2003/0191878 | A1 | 10/2003 | Shirley |
| 2003/0217123 | A1 | 11/2003 | Anderson |
| 2004/0015980 | A1 | 1/2004 | Rowen |
| 2004/0042547 | A1 | 3/2004 | Coleman |
| 2004/0045030 | A1 | 3/2004 | Reynolds et al. |
| 2004/0062305 | A1 | 4/2004 | Dambrackas |
| 2004/0093401 | A1 | 5/2004 | Buswell et al. |
| 2004/0117426 | A1 | 6/2004 | Rudkin |
| 2004/0249953 | A1 | 12/2004 | Fernandez |
| 2005/0018766 | A1 | 1/2005 | Iwamura |
| 2005/0027890 | A1 | 2/2005 | Nelson |
| 2005/0030377 | A1 | 2/2005 | Li |
| 2005/0044184 | A1 | 2/2005 | Thomas |
| 2005/0094577 | A1 | 5/2005 | Ashwood-Smith |
| 2005/0104852 | A1 | 5/2005 | Emerson |
| 2005/0114894 | A1 | 5/2005 | Hoerl |
| 2005/0125519 | A1 | 6/2005 | Yang |
| 2005/0132403 | A1 | 6/2005 | Lee |
| 2005/0195775 | A1 | 9/2005 | Petite |
| 2005/0204082 | A1* | 9/2005 | Thomas et al. ............... 710/100 |
| 2006/0083205 | A1 | 4/2006 | Buddhikot |
| 2006/0095539 | A1 | 5/2006 | Renkis |

OTHER PUBLICATIONS

AdderViewOSD, Products Brochure, RCI 173246-173279, Aug. 1, 2002.

Avocent's Pre-Markman Hearing Memorandum in Support of its Proposed Claim Constructions (Dec. 15, 2004).

Avocent Redmond's Answering Pre-Markman Hearing Briefing (Jan. 18, 2005).

Avocent Redmond's Supplemental Responses to Raritan's Second Set of Post-Remand Interrogatories (Nos. 15R-17R), Mar. 14, 2005.

Apex, OutLook User Guide, 1997.

Apex et al., Products Brochure, APX 082949-082971, 1996.

Apex PC Solutions, Users Guide, 1993.

Apex, Products Brochure, APX 018983-018996, Jan. 7, 1997.

Apex, Products Brochure, APX 019103-019121, 1995-1996.

Apex, Products Brochure, APX 056304-056346, Oct. 1, 1998.

Apex et al, Products Brochure, APX 316564-316621.

Apex et al, Products Brochure, APX 316848-316909.

Apex et al, Products Brochure, APX 316910-316969.

Apex's Sales Brochure, Sep. 1, 1998, 1 page.

Apex, SwitchBack User Guide, 1995.

Apex's Motion on the PolyCon Catalog and Supporting Memorandum, Jan. 15, 2002.

Apex's Proposed Markman Findings, Jan. 25, 2002.

Appendix1 to Apex's Proposed Markman Findings, Jan. 25, 2002.

Badman, Switching into High Gear, Network Computing, Apr. 30, 2001.

Belkin, The OmniView PRO User Manual, Jul. 16, 2001.

Bruce McNair Deposition Transcript, Case No. 01-CV-4435, May 5, 2005.

Compaq, White papers, 1996, APX 083313-APX 083326, APX 083335-APX 083389.

Ching-I Hsu Deposition Transcript, Case No. 01-CV-4435, Mar. 11, 2005.

Cybex, Director Installer/User Guide, Nov. 1996.

Cybex, 4×P & 1×P KVM Switches Guide to Applications, 1996.

Datavision, Product Brochure, 1992, 3 pages.

Declaration of Joseph C. McAlexander in Support of Apex's Motion for a Preliminary Injunction, Sep. 17, 2001.

Declaration of Joseph C. McAlexander, III in the Civil Action No. 01-CV-4435, Dec. 15, 2004.

Declaration of Sharad Malik, Ph. D., Jan. 8, 2002.

Declaration of Sharad Malik, Ph.D. (Jan. 18, 2005).

Defendant Raritan Computer Inc.'s Claim Construction Statement (Dec. 15, 2004).

Defendant Raritan Computer Inc.'s Motion for Partial Summary Judgment (Jan. 8, 2002).

Defendant Raritan Computer Inc.'s Proposed Findings of Fact and Conclusions of Law, Apr. 27, 2005.

Defendant Raritan Computer Inc.'s Reply to Avocent's Proposed Claim Constructions (Jan. 18, 2005).

Defendant Raritan Computer Inc.'s Response to Plaintiffs First Set of Post Remand Interrogatory Requirements to Raritan (No. 1R-16R). (Dec. 16, 2004). (enclosed).

Defendant Raritan Computer, Inc.'s Response to Plaintiff's Second Set of Interrogatories (Nos. 9-12), Oct. 30, 2001.

Defendant Raritan Computer, Inc.'s Second Set of Interrogatories to Plaintiff Apex, Nov. 16, 2001.

Defendant Raritan Computer, Inc.'s Supplemental Response to Plaintiff's First Set of Interrogatories (Nos. 9-12), Aug. 31, 2001.

Defendant Raritan Computer, Inc.'s Supplemental Response to Plaintiff's Second Set of Interrogatories (Nos. 9-12), Dec. 12, 2001.

DEI, Central Control of Multiple PCs Without Massive Cabling, product brochure, Nov. 1992.

Expert Report by Joseph C. McAlexander Regarding Infringement and Validity of U.S. Patent Nos. 5,884,096, 5,937,176 and 6,112,264, Jan. 3, 2001.

Expert Report by Joseph C. McAlexander Regarding Infringement and Validity of U.S. Patent Nos. 5,884,096, 5,937,176 and 6,112,264, Jan. 3, 2001. Claim Charts.
Expert Report of Michael H. Davis, Jan. 13, 2002.
Expert Report of Sharad Malik, Regarding Noninfringement and Invalidity of U.S. Patent Nos. 5,884,096, 5,937,176 and 6,112,264, Jan. 13, 2002. (Unexecuted).
File History of U.S. Patent No. 5,721,842, Feb. 24, 1998.
File History of U.S. Patent No. 5,732,212, Mar. 24, 1998.
File History of U.S. Patent No. 5,884,096, Mar. 16, 1999.
File History of U.S. Patent No. 5,937,176, Aug. 10, 1999.
File History of U.S. Patent No. 6,112,264, Aug. 29, 2000.
File History of Reissue U.S. Patent No. 5,732,212, Apr. 11, 2002. Part 1.
File History of Reissue U.S. Patent No. 5,732,212, Apr. 11, 2002. Part 2.
File History of U.S. Appl. No. 10/032,325, Jun. 14, 2004.
Findings and Conclusions, *Apex* v. *Raritan*, Civil Action No. 01-CV-0035, Feb. 25, 2002.
Investor's Business Daily, Box Keeps Monitors, Mice to a Minimum, Sep. 8, 1997.
Joseph C. McAlexander Deposition Transcript, Case No. 01-CV-4435, Apr. 27, 2005.
KVM Switch History, Aug. 2, 2002, 2 pages.
KVM Switches Roundup, Windows NT Magazine, Jul. 1997.
Lan Times, The beauty of Apex is a two-sided story, Nov. 20, 1995.
Lightwave Communications, Inc., Product Brochure, APX 304594-304605, Jun. 1, 1998.
Lu, E&J Int. 4-Port KVM Switch, Jul. 4, 2001.
Marksman Transcript, *Avocent* v. *Raritan*, Civil Action No. 4435, Feb. 3, 2005.
Marksman Transcript, *Avocent* v. *Raritan*, Civil Action No. 4435, Feb. 4, 2005.
Memorandum and Order on Marksman issues, Case No. 01-CV-4435, (Mar. 11, 2005).
Network Computing, Product Brochure, May 15, 1995, 5 pages.
Network Technologies Inc., Product Brochure, 1998, 2 pages.
Network World, advisement, Jul. 6, 1992.
Ocean Isle, Reachout Product Brochure, RCI 172996-173006, Jun. 1994.
PC World, New Products, May 1995, 2 pages.
PolyCon GmbH Data System Inc., product catalogs, APX 024328-042697, prior to Spring, 1995.
Press Release, Maintain Error-Free Central Control of 128 PCs from One Set of Keyboard, Mouse, and Monitor, Feb. 4, 1999, 1 page.
Protest Under 37 CFR 1.291 Filed in U.S. Appl. No. 08/969,723, Feb. 13, 1999.
Raritan, CompuSwitch, Mar. 16, 1998, 1 page.
Raritan, Dominion KSX, Jul. 19, 2003, RCI 139356-139371.
Raritan, Dominion KX and Dominion KSX, 2004, 181193-181211.
Raritan, MasterConsole MXU2, Jul. 31, 2001.
Raritan, MasterConsole II, User's Manual, 2000.
Raritan, Paragon UMT2161, RCI 147483-147505, Jul. 5, 2002.
Raritan, Paragon User's Guide, Jun. 15, 2000.
Raritan, Paragon II User Manual, 2004.
Raritan, Products Brochure, 2004-2005, p. 185899-185912.
Raritan, Product Introduction, Oct. 23, 2000.
Rebuttal Expert Report of Joseph C. McAlexander Regarding Validity and Infringement of U.S. Patent Nos. 5,884,096, 5,937,176 and 6,112,264, Apr. 11, 2005.
Rextron, Product Brochure, Aug. 1, 2002, 5 pages.
Rose Electronics, "Master Switch Installation and Operation Manual," 1991.
Rose Electronics, UltraView Installation and Operation Manual, 1991-1997.
Rose Electronics, Ultra View, Aug. 1, 2002, RCI 173332-173336.
Startech Computer Products Ltd., Product Press Release, APX 304618-304619, Feb. 1998.
Supplemental Expert Report of Bruce McNair Regarding United States Patent Nos. 5,884,096 & 6,112,264 and 5,937,176, Apr. 17, 2005.
Supplemental Expert Report of Joseph C. McAlexander Regarding Infringement of U.S. Patent Nos. 5,884,096, 5,937,176 and 6,112,264, Mar. 22, 2005.
Supplemental Expert Report of Michael H. Davis, Apr. 18, 2005.
SwitchCom, ProServer, Aug. 1, 2002, 2 pages.
Tikkler, Belkin OmniView SE 4-Port KVM Switch, Nov. 8, 2000.
Tony Dekerf and Gary D. Davis, "A Close Look At Modern Keyboard, Video & Mouse Switches," 1995.
Trial Transcript, *Apex* v. *Raritan*, Southern District of New York, Case No. 01-CV-4435, vol. 1, Jan. 2002.
Trial Transcript, *Apex* v. *Raritan*, Southern District of New York, Case No. 01-CV-4435, vol. 2, Jan. 2002.
Trial Transcript, *Apex* v. *Raritan*, Southern District of New York, Case No. 01-CV-4435, vol. 3, Jan. 2002.
Trial Transcript, *Apex* v. *Raritan*, Southern District of New York, Case No. 01-CV-4435, vol. 4, Jan. 2002.
Trial Transcript, *Apex* v. *Raritan*, Southern District of New York, Case No. 01-CV-4435, vol. 5, Jan. 2002.
Trial Transcript, *Apex* v. *Raritan*, Southern District of New York, Case No. 01-CV-4435, vol. 6, Jan. 2002.
Trial Transcript, *Apex* v. *Raritan*, Southern District of New York, Case No. 01-CV-4435, vol. 7, Jan. 2002. (enclosed).
Tron International, Inc., KVM Products Catalogs, 1997. (enclosed).
Tron International, Inc., Products Catalogs, 1996. (enclosed).
Tron International, Inc., Product Brochure, 1997, 4 pages. (enclosed).
Unisys, PW2 Advantage Series Rackmount Server, 1995. (enclosed).
Yee Liaw Deposition Transcript, Case No. 01-CV-4435, Mar. 3, 2005. (enclosed).
Yee-Shung Liaw Deposition Transcript, Case No. 01-CV-4435, Dec. 6, 2001. (enclosed).
Docket for case # 1:01-cv-04435-PKC, US District Court for the Southern District of New York, Oct. 23, 2003. (enclosed).
Yueh-Feng Lee, "A Configurable Java Architecture for Mobile Terminal Software," Wireless Communications Conference, WCNC2002 IEEE, Mar. 17-21, 2002, vol. 1, abstract.
The International Search Report and Written Opinion mailed on Aug. 31, 2006, in the related PCT application No. PCT/US04/29899.
The International Search Report and Written Opinion mailed on May 11, 2006, in the related PCT application No. PCT/US05/25275.
The International Search Report and Written Opinion mailed on Jul. 20, 2006, in the related PCT application No. PCT/US05/40948.
The International Search Report and Written Opinion mailed on Sep. 25, 2007, in the related PCT application No. PCT/US05/07684.
The International Search Report and Written Opinion mailed on Mar. 14, 2007, in the related PCT application No. PCT/US06/12280.
The International Search Report and Written Opinion mailed on Sep. 19, 2007, in the related PCT application No. PCT/US06/38567.
The Extended European Search Report mailed on Oct. 27, 2010, in the related European Publication No. 1825459.
The Office Actions issued in the related U.S. Appl. No. 10/666,940 on May 24, 2006, Feb. 6, 2007, Jun. 20, 2007, Feb. 22, 2008 and Sep. 8, 2008.
The Office Actions issued in the related U.S. Appl. No. 10/666,940 Nov. 21, 2008, May 11, 2009, Jan. 22, 2010 and Nov. 15, 2010.
The Office Action issued in the related U.S. Appl. No. 10/898,001 on Sep. 5, 2008.
The Office Actions issued in the related U.S. Appl. No. 10/898,001 on Jun. 3, 2009.
The Office Actions issued in the related U.S. Appl. No. 10/988,184 on Sep. 14, 2007, Apr. 9, 2008, Jun. 27, 2008 and Aug. 21, 2008.
The Office Actions issued in the related U.S. Appl. No. 10/988,184 on Feb. 19, 2009, Sep. 23, 2009 and Jun. 14, 2010.
The Office Actions issued in the related U.S. Appl. No. 10/233,299 on Aug. 4, 2005, Jan. 11, 2006, Jul. 24, 2006 and Jan. 4, 2007.
The Office Actions issued in the related U.S. Appl. No. 10/233,299 on Jan. 31, 2007, May 21, 2007, Jul. 13, 2007 and Jul. 24, 2007.
The Office Actions issued in the related U.S. Appl. No. 10/233,299 on Oct. 29, 2007, Dec. 3, 2007, Feb. 13, 2008 and May 23, 2008.
The Office Actions issued in the related U.S. Appl. No. 10/233,299 on Jan. 23, 2009 and Oct. 21, 2009.
The Office Actions issued in the related U.S. Appl. No. 10/799,349 on Jun. 13, 2007, Sep. 8, 2008, Feb. 3, 2010 and Aug. 19, 2010.

The Office Actions issued in the related U.S. Appl. No. 11/102,450 on Oct. 3, 2008, Dec. 18, 2009 and Aug. 9, 2010.

The Office Actions issued in the related U.S. Appl. No. 11/241,845 on Jun. 4, 2008, Jan. 21, 2009, Jul. 31, 2009, Mar. 24, 2010 and Nov. 1, 2010.

The extended European Search Report by the European Patent Office, mailed on Apr. 17, 2012, in the related European Application No. EP 06740384.0.

The extended European Search Report by the European Patent Office, mailed on Apr. 18, 2012, in the related European Application No. EP 05730955.1.

The extended European Search Report by the European Patent Office, mailed on Feb. 20, 2012, in the related European Application No. EP 05772143.3.

The extended European Search Report by the European Patent Office, mailed on Jan. 24, 2012, in the related European Application No. EP 04783929.5.

The Notice of Allowance, mailed on Apr. 4, Jul. 25 & Sep. 1, 2011, respectively, in related U.S. Appl. No. 10/666,940, now U.S. Pat. No. 8,068,546.

The Office Action, mailed on Sep. 15, 2011, in related U.S. Appl. No. 11/241,845.

The Office Actions, mailed on Mar. 23, 2011, Feb. 1, 2012 and May 16, 2012, in related U.S. Appl. No. 12/947,743.

Artimi Ltd., "UWB & Mesh Networks White paper," Aug. 2003.

Sachin et al., "A Real-Time Interactive Virtual Classroom. Multimedia Distance Learning System," IEEE Transactions on multimedia, vol. 3, No. 4, Dec. 2001.

Balaouras et al., "Potential and Limitations of a Teleteaching Environment based on H.323 Audio-Visual Communication Systems," Computer Networks, vol. 34, Issue 6, Dec. 2000, pp. 945-958.

The Communication from the Examining Division by the European Patent Office, mailed on May 10, 2012, in the related European Application No. EP 04783929.5.

The extended European Search Report by the European Patent Office, mailed on May 3, 2012, in the related European Application No. EP 06816094.4.

* cited by examiner

WIRELESS MANAGEMENT OF REMOTE DEVICES

CROSS REFERENCE TO RELATED APPLICATIONS

This application is a Continuation of application Ser. No. 10/988,184, filed Nov. 12, 2004 now U.S. Pat. No. 7,818,480, which is a continuation-in-part of application Ser. No. 10/799,349, filed Mar. 12, 2004, and a continuation-in-part of application Ser. No. 10/233,299, filed Aug. 29, 2002 now U.S. Pat. No. 7,684,483. Each of prior mentioned applications is hereby incorporated by reference.

FIELD OF THE INVENTION

The present invention relates to a multifunctional wireless network management system for remotely monitoring and controlling network and computer equipment from one or more local user workstations over a wireless and/or hard wired network. Specifically, a keyboard, video monitor, and a cursor control device attached to a user workstation are utilized to remotely monitor and control remote computers, servers, domain servers, file/print servers, headless servers, network appliances, serial IT equipment, switches, routers, firewalls, security interfaces, application servers, load balancers, and the power supplies to these devices. The system is multifunctional as it allows multiple users to operate multiple remote devices using serial, KVM, and power supply control.

BACKGROUND OF THE INVENTION

In many situations, it is desirable to manage networking equipment, servers, and computers distributed across a network. Early keyboard, video and mouse ("KVM") switches enabled access to remote devices from distances of up to fifteen hundred (1,500) feet over dedicated Category 5 ("CAT5") cables. Newer systems utilize existing networks such as local area networks ("LANs") or wide area networks ("WANs") to enable a user workstation to access the keyboard port, video port, and cursor control device port of a remote device. If the distance between the user workstation and the remote device is great enough, the Internet is commonly utilized to enable remote control of computers from a user workstation.

Early solutions for enabling control of remote computers via a network or the Internet were implemented using software. For example, the software program pcAnywhere allows remote access to a computer through the Internet or a LAN. Remote computer access programs, such as pcAnywhere, typically require installation of software on each remote computer. To access a remote computer, a user of the user workstation selects the desired remote computer from a list and (optionally) enters an appropriate username and password. Once access has been granted to the remote computer, the user utilizes the keyboard, video monitor, and cursor control device attached to the local user workstation to operate and control the remote computer.

To obviate the need to install a software program on each remote computer, solutions have been proposed whereby a remote access device is coupled to each remote computer to communicate with the user workstation. In these solutions the intermediate remote access device receives video from a remote computer, and using a software program (e.g., pcAnywhere) transmits the video to a user workstation. The software program is also used to receive keyboard and cursor control device signals from the user workstation. The remote access device then supplies these signals to the keyboard port and cursor control device port of the remote computer. Using an intermediate remote access device eliminates the need for software to be installed on each remote computer, but still relies on proprietary software, such as pcAnywhere.

Solutions have been proposed that fully eliminate the use of software programs such as pcAnywhere. These hardware solutions typically use a KVM switch which is accessible over the Internet or LAN via a common protocol, such as TCP/IP. Such hardware solutions may also utilize a modem to connect to the Internet. Generally, a user or system administrator accesses the remote computers attached to the KVM switch utilizing an Internet web-browser or client software associated with the KVM switch. Once the remote computer has been selected, video signals from the remote computer are routed to the user workstation's video monitor. Simultaneously, a user can control the remote computer using a local keyboard and/or cursor control device. The KVM switch may additionally include a connection to the power source of the remote computer for a hard reboot in case of system failure. These solutions are generally limited to KVM and/or power control via a hard-wired connection. These solutions are also limited because they do not offer wireless access, serial control, scalable solutions, etc. In short, these solutions generally only provide one function for a user workstation; KVM access to a single remote device.

Recently there has been a proliferation of wireless technologies to enable computers to communicate and share resources. For example, the Bluetooth and Institute of Electrical and Electronics Engineers ("IEEE") 802.11 standards are two rapidly developing technologies that allow computers to wirelessly communicate with one another. Devices are commercially available that comply with the 802.11 standard and enable wireless TCP/IP communications over distances of up to three hundred (300) feet or more. For example, PCMCIA wireless cards enable laptops to communicate utilizing the TCP/IP protocol. Many 802.11 compatible wireless local area networks ("WLANs") are now utilized in lieu of, or in conjunction with, local area networks. In contrast, Bluetooth devices are generally utilized for shorter range communication, utilizing lower transmission rates than 802.11 compliant devices.

The 802.11 standard, ratified by the IEEE in 1997, is a wireless communications standard generally utilized for networking, file sharing and Internet connection sharing. In 1999, two extensions to the 802.11 standard were added, 802.11a and 802.11b. The 802.11a standard operates in a frequency range of 5 Gigahertz ("GHz") at speeds of up to 54 Megabits per second ("Mbps"). The 802.11b standard (also known as WiFi), was designed to be more affordable, and operates in the 2.64 GHz range at speeds of up to 11 Mbps. With the proliferation of 802.11b devices, the 802.11g standard was recently ratified which allows for 802.11a speeds in 802.11b compatible frequencies.

All 802.11 standards allow computers to communicate wirelessly, eliminating the need for hubs, routers, switches, etc. The 802.11 standard allows for the creation of WLANs, which use the same TCP/IP communication protocols as traditional wired LANs. With commercially available wireless communication devices, two computers can communicate from up to three hundred (300) feet away. However, with repeaters, stronger antennae, signal boosters, etc., can increase this range. Today, wireless networks are available in airports, coffee shops, college campuses, etc.

Importantly, the 802.11 standard allows for at least two different network configurations: (1) an infrastructure mode in which all traffic passes through a wireless "access point";

and (2) an "ad-hoc" mode (or "peer-to-peer" mode) in which devices communicate without an access point. Independent of the mode, the 802.11 standard supports wireless networks that offer the same communications (e.g., TCP/IP, file sharing, Internet sharing, etc.) as a wired connection.

In the infrastructure mode, devices communicate through a wireless access point. An access point is similar to a hub, or router (but without wires), in that it receives and transmits all data between wireless devices. Advantages of the infrastructure mode include increased scalability, increased range of communication, and access to a wired network. By adding additional access points, the network can grow without undue burden on any one device. An access point can also be utilized to increase the range of communications. Cascading access points and signal boosters can overcome the three hundred (300) foot communication limit of most 802.11 devices. Finally, traditional access points also offer access to a wired network. Therefore, an infrastructure network easily adapts to communicate with an Ethernet LAN or an Internet connection.

An ad-hoc network is more dynamic—it can be created and torn-down easily without additional hardware. Computers can enter and leave the network so long as the computer is configured to access a wireless network with the same service set identifier ("SSID") as other computers in the network. Generally, an SSID is a sequence of alphanumeric characters that identifies the ad-hoc network. The ad-hoc network also advantageously requires no external hardware. An ad-hoc network can be created with multiple computers alone, so long as each computer has a WiFi compatible communications device.

An important feature of the 802.11 standard is the availability of multiple channels of communications, utilizing Direct Sequence Spread Spectrum ("DSSS") technology, to allow for this feature. DSSS is a technology that allows for the transmission of data over a range of frequencies, which decreases the power utilized at any one frequency. Therefore, DSSS allows for fast communications with little interference. Thus, DSSS permits an 802.11 network to include multiple communications channels. Further, the wireless network can co-exist with other wireless devices that operate in similar frequency ranges.

Generally, in an ad-hoc network, one of the available channels (the FCC currently allows for eleven (11) total channels) is utilized as a "broadcast" channel. The broadcast channel allows devices to "discover" other devices in range of communication and to transmit messages that are received by all devices. Thus, the broadcast channel is a critical feature of the 802.11 standard that allows for the creation of ad-hoc networks in which devices can automatically join and leave the network. The network then utilizes one of a variety of algorithms such as a spokesman election algorithm ("SEA") or a broadcast/flooding algorithm for all other communications. In SEA, one computer is "elected" to head the network and tracks the addition of other computers to and from the network. In a broadcast/flooding algorithm, generally all messages are sent to all computers. If an access point is utilized, then no such algorithms are necessary. Instead, the access point can be utilized to ensure that all messages reach the correct destination.

Systems that enable wireless access of a remote device are currently known in the art of computer management. For example, one such system comprises a single receiver and a single transmitter that together allow a user to access a remote computer using a keyboard, video monitor, and cursor control device. In this system, both the receiver and the transmitter are enabled for wireless communication. The receiver, coupled to the keyboard and mouse, receives keyboard and mouse data and wirelessly transmits this data to the transmitter. The transmitter is coupled to a remote computer and supplies the data to the keyboard and mouse ports of this remote computer. Simultaneously, the transmitter receives video data from the remote computer and transmits this data wirelessly to the receiver where it is displayed on the video monitor coupled to the receiver. Thus, this system enables extended length access of a single remote computer through a wireless connection.

Another known system consists of a switching device for controlling multiple remote computers where the switching device comprises a wireless transmitter and a wireless receiver. The switching device is configured to enable a user to select from among multiple computing devices and wirelessly link a peripheral device with a selected computing device for user interaction. In this system, the switching device initially develops a list of available computing devices. A user chooses from this list and the switching device establishes a wireless link with the corresponding computing device. Thus, this wireless switch only enables one connection between a user and a remote computer at any instance. Further, each of the computing devices must also have wireless communication capabilities to enable wireless communication with the switch.

A method for switching the utilization of a shared set of wireless I/O devices between multiple computers is also known in the art. This method includes the utilization of a software based switching mechanism where wireless protocols enable the sharing of wireless peripheral devices between multiple computers. A wireless data packet (a "token") is utilized to transfer control of the I/O devices utilizing a "master-slave" relationship for the transfer of control. The token is the form of computer-to-computer wireless command utilized to transfer control of a wireless peripheral device from one device to another. Thus, in this known system, server-to-server communications are necessary for transferring the control of a wireless peripheral. Further, in this system only one computer can control a set of wireless peripherals at a time.

In another known system for accessing computer systems in a computer network, each computer system provides and receives operator interface data signals containing user output and input information. Central to this system is a wireless administrator device that allows a system operator to remotely control a plurality of computer systems interconnected through a communications network. The wireless administrator device includes a wireless communications module that operates in "transmit" and "receive" modes to communicate with the wireless communication modules coupled to the computer systems. The wireless administrator device includes an operator interface with a video display, mouse and keyboard to enable user interaction in a selection mode or a control mode. The interface includes a manual connect button that allows the administrator to display on the video a list of available computer systems that may be accessed. Upon selection of a computer, the administrator remotely controls the computer through the operator interface.

Finally, systems are also known that provide a wireless interface between a remote host computer and a personal digital assistant ("PDA"). In one such system, the PDA presents the user with a graphical user interface ("GUI") allowing for input by way of a passive stylus, which can be used in a pen mode or a mouse mode. The PDA also includes a transceiver that communicates wirelessly with the transceiver of a remote computer. The transceiver allows the wireless device to access the remote host computer over a wireless LAN or through a peer-to-peer network. The system also allows a user to view available remote host computers through the GUI of the wireless device and to access the programs and files of the remote computer. The remote computer in turn, transmits display commands to the wireless device. A similar system utilizes Bluetooth communications to enable a PDA to recognize and identify all compliant remote devices by transmitting a broadcast message that is received by compliant remote devices. In this system, the PDA includes a GUI to display a rendering of a mechanism that can be utilized to control a remote device. For example, the rendering might be of an on/off switch. The PDA receives input from a stylus, and translates this input into a command for the remote device.

In view of the foregoing, a need clearly exists for a comprehensive multifunction remote device management system capable of wirelessly operating and controlling a number of remote servers, file/print servers, headless servers, network appliances, serial IT equipment, switches, routers, firewalls, security interfaces, application servers, load balancers, and environmental controls as their associated power supplies are connected to a remote control device. Such a system should offer a variety of functions to a user including controlling devices via KVM access, controlling devices via serial port access, and controlling the power supply of devices. The system should also be accessible via a wireless and/or hard wired connection. Furthermore such a system should easily scale to allow for the access and control of many remote devices simultaneously by many different user workstations. Finally, such a system should enable both serial and KVM access to such remote devices.

SUMMARY OF THE INVENTION

The present invention is a system and method that enables users to remotely access computers, servers, and networking equipment from local user workstations. The invention also enables users to control the power supply of these devices. The system enables multiple users to access multiple remote devices in a variety of ways (wireless access, wired access, direct KVM access, modem access, etc.) to control and interact with the devices using a variety of control methods (KVM control, serial control, etc.). In this sense, the system is multifunctional and thus an improvement over existing systems, which generally only offer KVM access over hard-wired connections.

Central to the invention is a wireless-enabled remote management unit ("W-RMU"). The W-RMU communicates with multiple user workstations through wireless or wired TCP/IP connections and with the remote devices via a chain-like arrangement of computer interface modules ("Z-CIMs"). Thus, the W-RMU enables a user at a local user workstation to access and control any of the remote devices as if the user were physically present at the device.

Each remote device bi-directionally communicates with a Z-CIM, which in-turn communicates with the W-RMU. Generally, networking equipment is accessible via a serial port and computers and servers are accessible via a keyboard port, video port and cursor control port (KVM ports). Therefore, the system preferably includes two classes of Z-CIMs, a first class which communicates with KVM ports, and a second class which communicates with a serial port.

To interface the remote devices to the W-RMU, the Z-CIMs are preferably connected in a chain-like arrangement such that only the first and last Z-CIMs in the chain directly connect to the W-RMU. The connections between the Z-CIMs and the connections from the Z-CIMs to the W-RMU are both preferably accomplished with CAT5 cabling, although other types of cabling may be used. Advantageously, the chain of Z-CIMs can be a hybrid chain (i.e., a mix of both KVM port Z-CIMs and serial port Z-CIMs). Thus, the Z-CIMs enable the system to offer multiple functions (e.g., serial access, KVM access, etc.) to multiple users simultaneously.

Using a chain-like configuration of Z-CIMs has a number of advantages. First, the Z-CIM configuration is easily scalable; servers or other devices can be added to the system by inserting a corresponding Z-CIM at any point in the chain. Second, the Z-CIM configuration does not require each remote device to directly connect to the W-RMU. Therefore, the distance between the W-RMU and a remote device is not severely constrained. Third, a Z-CIM configuration is easy to implement efficiently and inexpensively. Specifically, the Z-CIM configuration does not require tiered levels of KVM switches or devices, which are generally necessary in traditional configurations. The chain-like arrangement thus enables the W-RMU to communicate with many (e.g., sixty-four (64) or more) remote devices despite only two Z-CIMs direct connections.

To increase the flexibility and efficiency of the system, a Z-CIM preferably does not require its own power source. Instead, the first class of Z-CIMs (i.e., KVM port Z-CIMs) receives power from a corresponding computer or server. The second class of Z-CIMs (i.e., serial port Z-CIMs) advantageously receives power from the W-RMU. In the set up of the second class, power is supplied over the wiring, preferably CAT5 cabling, between the W-RMU and the Z-CIMs.

The W-RMU bi-directionally communicates with each remote device through the chain of Z-CIMs. The W-RMU also bi-directionally communicates with one or more user workstations via TCP/IP connection(s). The TCP/IP connection may be through a LAN, WAN, the Internet, or through a wireless connection. Preferably, the W-RMU employs one or more 802.11 compliant devices (e.g., Wi-Fi compatible wireless cards) to enable wireless communication in an ad-hoc or peer-to-peer wireless network. Alternatively, the W-RMU may act as a wireless access point, in which case the wireless communications between the user workstations and the W-RMUs is completed in an 802.11 compliant infrastructure mode. Regardless of the specific type of wireless communications utilized, the network protocol used for these communications is preferably TCP/IP. Of course, other types of access (modem, serial, direct KVM access) are also supported by the W-RMU.

To utilize the system of the present invention, a user first initiates a management session by utilizing client software located on a user workstation to connect to the W-RMU. Alternatively, the user may utilize an Internet browser to wirelessly connect to the W-RMU. The user is then prompted by the W-RMU to provide identification information such as a user name and password, biometric identification, an RFID tag, etc. The W-RMU is capable of storing multiple profiles and different levels of access for each profile. Once a user has been authenticated, the user is provided an option menu on the user workstation's monitor, which comprises a menu listing the networking equipment, servers, and computers accessible to the user. In the preferred embodiment, the option menu additionally contains an interface allowing a user to control the power to each piece of remote equipment. However, one skilled in the art will recognize that power control may be implemented in a variety of other ways. Alternatively, power could be controlled by a special Z-CIM that connects to another device, such as a power strip, or a Z-CIM connected over a wired or wireless LAN to another device.

Additionally, a Z-CIM could have a power control option, where the Z-CIM has an additional interface to cause the power cycle.

The option menu may be produced by option menu circuitry located in the W-RMU, or in the alternative, by software on the user workstation utilizing data from the W-RMU. The option menu is preferably interactive and enables the user to select desired networking equipment, a server, or a computer by utilizing the keyboard and/or cursor control device attached to the user workstation. Once a user makes a selection, the user is provided access to the remote equipment as if the user is physically located at the remote site.

If the user elects to control a serial device, the user is presented with a terminal-like window on the local monitor. Importantly, a user may have more than one such window open at a time, which enables the user to quickly switch between multiple serial devices. The user can enter data using the local keyboard or cursor control device. The user workstation receives this data and transmits it to the W-RMU as TCP/IP data. The W-RMU receives the TCP/IP data and extracts the information entered by the user. The W-RMU then creates serial data from this information which is transmitted to the remote device via that device's serial port connection to a Z-CIM and the Z-CIM connection to the W-RMU via the chain-like configuration.

Serial communication is bi-directional. When data is sent from the remote device to the user workstation, the output serial data is transmitted to the W-RMU via the Z-CIM. The W-RMU generates TCP/IP data that includes this serial data and then transmits the TCP/IP data to the user workstation via the wireless or hard-wired connection. The user workstation receives and interprets this TCP/IP data, and outputs the device response to the terminal window on the user workstation video monitor.

If the remote device selected by the user is a remote computer or server, the user is presented with a window that displays the "desktop" of the remote device. Again, the user may have multiple windows open, thus enabling the user to control multiple remote devices. Because the system is multifunctional, the user can have both serial device windows and KVM device windows open simultaneously.

When controlling a KVM device, communication of keyboard and cursor control device data is similar to the bi-directional transmission of serial data. Specifically, the user workstation transmits keyboard and cursor control device signals to the W-RMU as TCP/IP data. The W-RMU receives the TCP/IP data and transmits keyboard and cursor control device signals to the appropriate remote device. In the reverse direction, keyboard and cursor control device signals are transmitted from the remote device to the W-RMU via a Z-CIM. The W-RMU then generates TCP/IP signals which are transmitted to the user workstation.

The transmission of video signals from a remote device to the user workstation is more complicated. Before transmission via TCP/IP, the unidirectional video signals (i.e., from the remote device to the user workstation) are digitized by a frame grabber. This circuit captures video output from the initiating computer at a speed of at least twenty (20) frames/second and converts the captured analog video signals into a digital representation of pixels. In the preferred embodiment, each pixel is digitally represented with five (5) bits for red, five (5) bits for green, and five (5) bits for blue. The digital representation is then stored in a raw frame buffer. The compression algorithm then processes the digital data contained in the raw frame buffer. a compression algorithm is actually a combination of four sub-algorithms (i.e., the Noise Reduction and Difference Test ("NRDT"), Smoothing, Caching, and Bit Splicing/Compression sub-algorithms) as described in greater detail below. One skilled in the art will recognize that there are other encoding schemes possible. For example, six (6) bits of color could be used for green, five (5) bits for blue, and five (5) bits for red.

After the user workstation receives the video signals, decompression occurs. The user workstation operates as a decompression device by executing a decompression algorithm. Along with any transmitted video or data signals, the W-RMU transmits messages to the decompression devices regarding the portions of the video that yield "cache" hits (i.e., portions of unchanged video). In response, the decompression device constructs the video frame based upon the transmitted video signals and the blocks of pixels contained in its local cache. Also, the decompression device updates its local cache with the new blocks of pixels received from the W-RMU. In this manner, the decompression device caches remain synchronized with the compression device cache. Both the compression device and the decompression device update their respective cache by replacing older video data with newer video data.

Furthermore, in the preferred embodiment, the video signals transmitted by the W-RMU are compressed using a lossless compression algorithm. Therefore, the decompression device (e.g., software on the user workstation) must reverse this lossless compression. This is done by identifying the changed portions of the video image based upon flags transmitted by the W-RMU. From this flag information, the decompression device is able to reconstruct full frames of video. Alternatively, lossy compression may be used as it makes the compression more compact.

In addition, the decompression device converts the video frame to its original color scheme by reversing a color code table ("CCT") conversion. The decompression device, like the W-RMU, locally stores a copy of the same CCT used to compress the video data. The CCT is then used to convert the video data received from the W-RMU to a standard RGB format that may be displayed on the monitor attached to the user workstation.

The decompression algorithm can be implemented in the remote network management system of the present invention in a variety of embodiments. For example, in one embodiment, it can be implemented as a software application that is executed by the user workstation. In an alternate embodiment, the decompression algorithm can be implemented to execute within a web browser such as Internet Explorer or Netscape® Navigator®. Advantageously, such an embodiment eliminates the need for installation of application specific software on the user workstation. Also, this embodiment allows the W-RMU to easily transmit the video signals to any user workstation with Internet capabilities, regardless of the distance at which the remote device is located from the initiating computer. Such a feature reduces the cabling cost associated with the remote network management system of the present invention.

Finally, since the remote network management system of the present invention allows for platform independent communications, the compression algorithm utilized neither employs operating system specific hooks, nor uses platform specific Graphical Device Interface ("GDI") calls.

Because the video compression algorithm of the present invention is operating system independent, the W-RMU provides compatibility between various operating systems and/or communication protocols, including but not limited to, those manufactured by Microsoft Corporation ("Microsoft") (Windows), Apple Computer, Inc. ("Apple") (Macintosh), Sun Microsystems, Inc. ("Sun") (Solaris), Digital Equipment Corporation ("DEC"), Compaq Computer Corporation ("Compaq") (Alpha), International Business Machines ("IBM") (RS/6000), Hewlett-Packard Company ("HP") (HP9000) and SGI (formerly "Silicon Graphics, Inc.") (IRIX).

In the preferred embodiment, the compression algorithm described herein and in co-pending application Ser. No. 10/233,299 is used to transmit the video signals. However, the video transmission system is not limited to such an embodiment. Rather, this system may be employed with any compression algorithm without departing from the spirit of the invention.

As is known in the art of KVM switches and remote device management systems, security is of utmost concern. If access to the system (and to the transmission of data within the system) is not secure, hackers, competitors, or other unauthorized users can potentially view and manipulate confidential information. Therefore, it is preferred that a user is required to log-in with a user identification number and password, biometric identification data, an RFID tag, etc. The present invention also supports secure transmission of data between the W-RMU and the user workstations by integrating with digital encryption techniques. For example, a 128-bit encryption technique may be used both to verify the identity of the W-RMU and to encrypt and decrypt the transmitted video and data signals. In this embodiment, a 128-bit public key RSA encryption technique is used to verify the remote participant, and a 128-bit RC4 private key encryption is used to encrypt and decrypt the transmitted signals. Of course, other encryption techniques or security measures may be used.

Therefore, it is an object of the present invention to provide a multifunctional wireless remote device management system where one or more wireless-enabled user workstations can control multiple devices through serial port access or through keyboard, video and cursor control device port access where such devices are connected to a remote management unit through a chain arrangement of computer interface modules.

In addition, it is an object of the present invention to provide a wireless-enabled remote network management system that allows an authorized user to control any of a number of remote devices from one or more local user workstations.

Further, it is an object of the present invention to provide a remote network management system that allows one or more local user workstations to wirelessly access and operate remote networking equipment, servers, and computers connected to a remote management unit through a chain-like arrangement of computer interface modules.

It is another object of the present invention to provide a single, platform-independent remote network management system offering scalable, integrated, and secure control.

It is an additional object of the present invention to provide a remote network management system that enables a user to wirelessly access remote devices obviating the need to connect an extended length cable between the user workstation and the remote management unit.

It is a further object of the present invention to provide a remote network management system capable of BIOS-level control of KVM equipment and console-level control of serial devices through a wireless-enabled user workstation.

Further, it is an object of the present invention to provide a remote network management system which provides a single consolidated view of all servers and other connected devices from one screen via a web browser.

It is another object of the present invention to provide a remote network management system which contains a single sign-on and interface.

Additionally, it is an object of the present invention to provide a remote network management system which is upgradeable.

It is a further object of the present invention to provide a remote network management system which provides high performance over low bandwidth connections including wireless connections.

It is another object of the present invention to provide a remote network management system which utilizes a video compression algorithm and frame-grabber technology to ensure fast transmission of high quality video.

Furthermore, it is an object of the present invention to provide a remote network management system including built-in serial port buffering to provide views of recent console history.

It is still a further object of the present invention to provide a user-friendly wireless remote network management system.

In addition, it is an object of the present invention to provide a remote network management system that is compact and provides readily accessible communication ports.

Further, it is an object of present invention to provide a remote network management system, which allows error-free communications between peripheral devices of a local user workstation and networking equipment, servers, and computers located at domain servers, file/print servers, headless servers, network appliances, serial IT equipment, switches, routers, firewalls, security interfaces, application servers, load balancers, environmental controls, etc.

It is also an object of the present invention to provide a remote network management system capable of wirelessly controlling the power supply to remotely located networking equipment, servers, and computers.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENT

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

Figure 1:
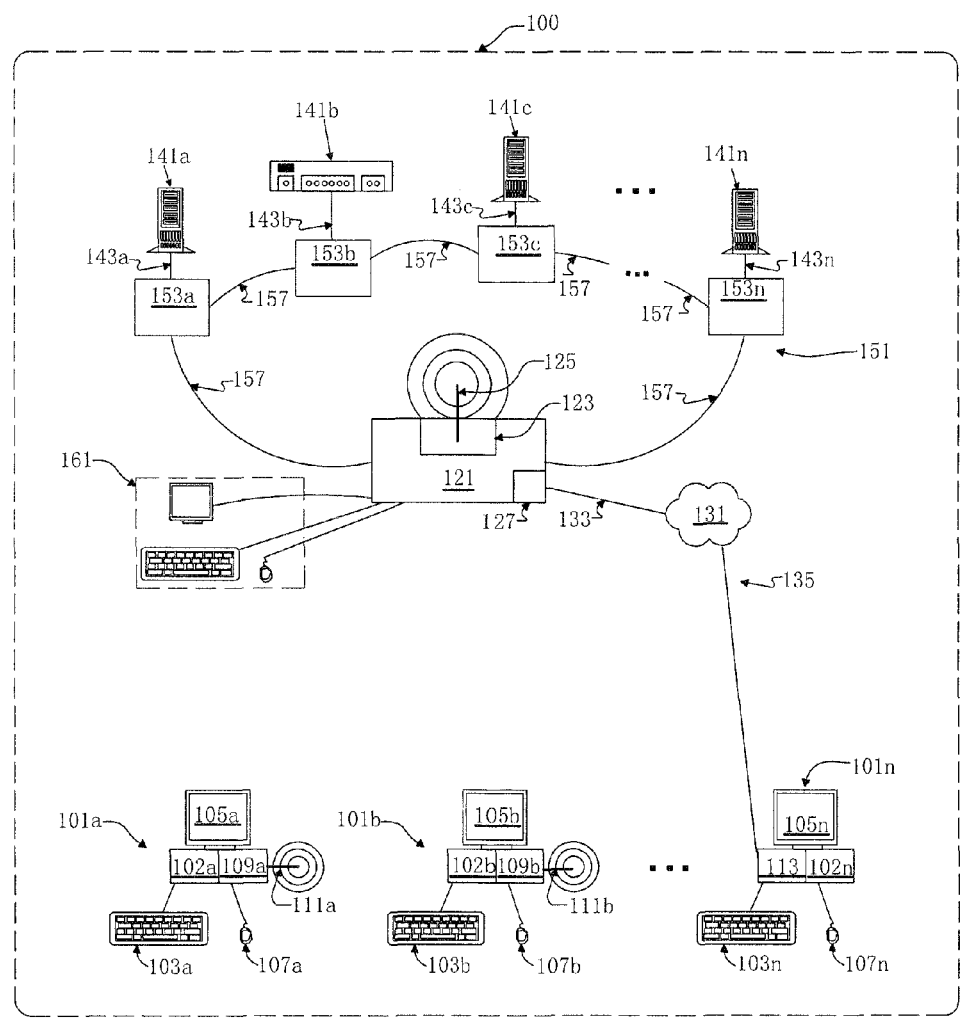
FIG. 1 is a schematic representation of the multifunction wireless remote device management system according to the preferred embodiment of the present invention, illustrating the connection of the wireless-enabled remote management unit ("W-RMU") to multiple remote devices via a chain of compact remote device interface modules ("Z-CIMs") and the wireless/wired communication between the W-RMU and multiple user workstations to enable a user to access and control any of the remote devices.

Referring first to FIG. 1, depicted is the preferred architecture of the multifunction wireless remote device management system in accordance with the present invention. Specifically, multifunction wireless computer management system 100 is shown including multiple user workstations 101a-n, where "n" is an integer representative of the number of workstations. Each user workstation 101a-n preferably comprises general purpose computer 102a-n coupled to keyboard 103a-n, video monitor 105a-n, and cursor control device 107a-n. Further, each user workstation 101a-n includes a circuit or device for communicating with W-RMU 121. For example, user workstations 101a-b include wireless communications devices 109a-b, which are preferably 802.11 compliant devices, although devices compliant with other known standards may be used. Each wireless communications device 109a-b preferably includes antenna 111a-b capable of transceiving wireless communications data. W-RMU 121 also includes a wireless communications device 123 and antenna 125 to enable transceiving of data to and from these wireless-enabled user workstations.

Preferably W-RMU 121 communicates wirelessly with one or all of user workstations 101a-b. Although any type of wireless network may be used, an 802.11 compatible network is preferable because it supports TCP/IP communication. If an 802.11 network is used, W-RMU 121 may be configured to act as a wireless access point. Alternatively, a peer-to-peer network may be established between W-RMU 121 and user workstations 101a-b.

Although 802.11 compliant wireless communications are the preferred wireless standard for use with the present invention, other types of wireless connections such as infrared communications or Bluetooth compliant communications may be utilized, depending on the specific needs of the system user. 802.11 compliant communications are preferred because 802.11 compliant communications allow for the creation of a peer-to-peer WLAN, where devices automatically discover other devices in the network. Further, the 802.11 standard enables communications over extended distances where the speed of the signal can automatically be reduced as the distance increases thus avoiding excessive degradation of the signal. Additionally, standard radio communications utilized in 802.11 standards do not require line-of-site communications. Finally, the 802.11 standard enables the system of the present invention to utilize TCP/IP communications, therefore enabling the establishment of a WLAN network without extensive software development.

W-RMU 121 preferably also includes other means of communicating with user workstations 101a-n. For example, W-RMU 121 may include network card 127 which enables connections to packet-switched networks such as LANs, WANs or the Internet. As depicted in FIG. 1, network card 127 connects to Internet 131 through connection 133. Similarly, any one or more of user workstations 101a-n may include network card 113 (only shown on workstation 101n), which enables user workstations 101a-n to connect to Internet 131 through connection 135.

W-RMU 121 may also include a modem (not shown in FIG. 1) to allow for telephone access. As is known in the art, modem connections are slow and thus generally reserved for emergency access (e.g., if there is Internet or network failure).

W-RMU 121 may also include local KVM access from administrator station 161, which connects directly to W-RMU 121 utilizing standard cabling and standard connections (e.g., PS/2, DB-9, DB-15, USB, etc.). The peripherals local to W-RMU 121 allow an administrator to configure, debug or upgrade W-RMU 121. The local peripherals can also be used to gain access to the remote devices for monitoring or control. Optionally, the system may be configured such that an administrator can perform these functions remotely from any one of workstations 101a-n or any other similar remote terminal or station.

To interface with remote devices, W-RMU 121 connects to chain 151 of compact computer interface modules ("Z-CIMs") 153a-n. At least two general classes of Z-CIMs are presently supported by the system of the present invention, a first class supporting KVM access, and a second class supporting serial port access to connect to various remote devices 141a-n. As shown in FIG. 1, Z-CIMs 153a and 153c are KVM Z-CIMs and connect to remote devices 141a and 141c through KVM connections 143a and 143c, respectively. Z-CIM 153b is a serial Z-CIM and connects to remote device 141b through serial connection 143b. Remote devices 141a-n shown in FIG. 1 are merely examples of typical remote devices accessed in system 100. More and different remote devices 141a-n are foreseeable without departing from the spirit of the invention.

Chain 151, comprised of a plurality of connections 157, connect the Z-CIMs to W-RMU 121 in a daisy chain arrangement. Alternatively, Z-CIM 153n may be connected to a terminator, as opposed to W-RMU 121. The terminator connects to the input of Z-CIM 153*n*. Preferably, connections 157 are CAT5 cables. CAT5 cabling is preferred because it reduces cabling cost while maintaining the strength of signals that are transmitted over an extended distance. CAT5 cables also enable transmission of power so that the serial Z-CIMs (e.g., Z-CIM 153*b*) can be powered by W-RMU 121. Because of the power requirements of KVM Z-CIMs 153*a* and 153*c*, these Z-CIMs are preferably powered by remote computers 141*a* and 141*c*, respectively.

Using the Z-CIM configuration described, W-RMU 121 enables connections to a variety of remote devices, which may use operating systems and protocols, including but not limited to those manufactured by Microsoft (Windows), Apple (Macintosh), Sun (Solaris), DEC, Compaq (Alpha), IBM (RS/6000), HP (HP9000) and SGI (IRIX). Additionally, local devices may communicate with remote computers via a variety of protocols including Universal Serial Bus ("USB"), American Standard Code for Information Interchange ("ASCII") and Recommend Standard-232 ("RS-232").

Operation of system 100 will now be described. To remotely control and manage remote devices 141*a-n* the user at one of user workstations 101*a-n* must first establish a connection with W-RMU 121, which may be any type of connection (wireless, wired, modem, direct, etc.). Preferably, the connection is a TCP/IP connection which enables secure and accurate communications between user workstation 101 and W-RMU 121.

Figure 2:
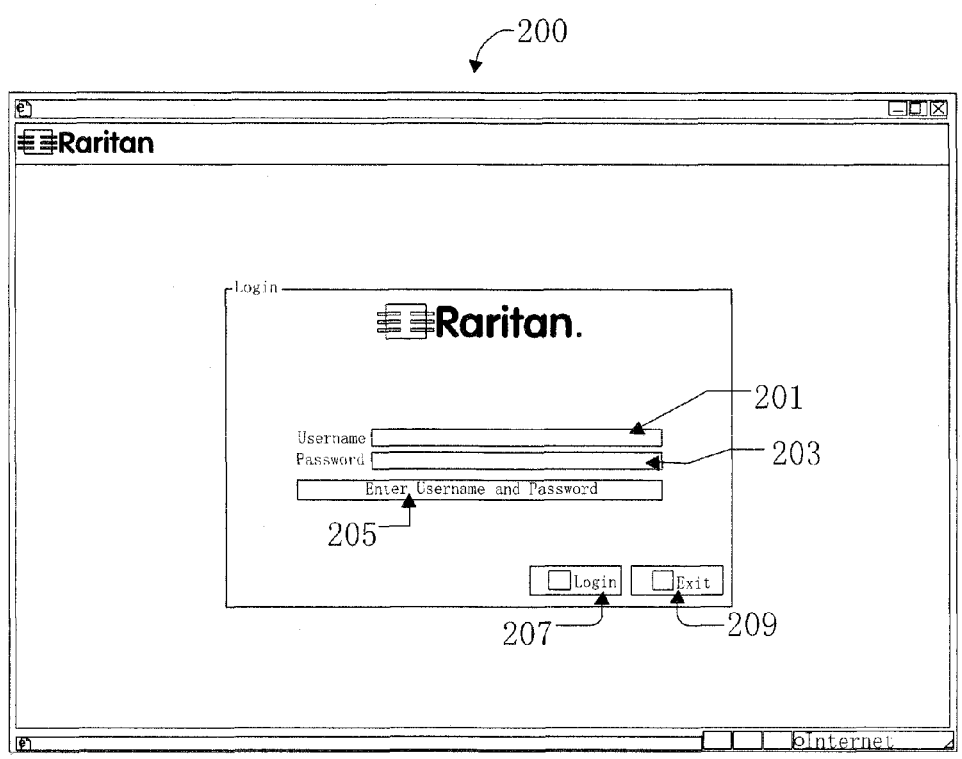
FIG. 2 is a screen-shot of an example log-in screen used to validate a user as authorized to access any of the remote devices connected to the multifunction wireless remote device management system according to the present invention.

Once the connection with W-RMU 121 is established, the user is preferably required to provide identification information before access to any of remote devices 141*a-n* is granted. This step limits the possibility of an unauthorized user tampering with remote devices 141*a-n* or gaining access to sensitive information. The identification information required from the user may consist of a user name and password, biometric identification information, information transmitted from a radio frequency identification ("RFID") tag, or some combination thereof. As depicted in FIG. 2, example log-in window 200 is presented to a user after a connection with W-RMU 121 is initiated. Log-in window 200, which is displayed on local video monitor 105, may consist of user-name field 201, password field 203, enter button 205, login button 207, and exit button 209.

To gain access, the user interacts with log-in window 200 using cursor control device 107 and keyboard 103. Specifically, the user enters his user identification information in user-name field 201 and his password in password field 203. When the user "clicks" login button 207 (using cursor control device 107), user workstation 101 transmits the information provided in user field 201 and password field 203 to W-RMU 121 as TCP/IP data.

Log-in window 200 may be generated by user workstation 101 or by W-RMU 121. For example, W-RMU 121 may transmit log-in window 200 as a web-page, making it accessible via a web-browser on user workstation 101. Alternatively, log-in window 200 may be generated by an Applet or by software local to user workstation 101.

Log-in window 200 is merely exemplary of one possible type of log-in compatible with the invention. The log-in process may require identification such as biometric identification (e.g., fingerprints, voiceprints, retinal scans, etc), RFID signals, etc. Alternatively, the system can be configured to skip the log-in procedure.

Figure 3:
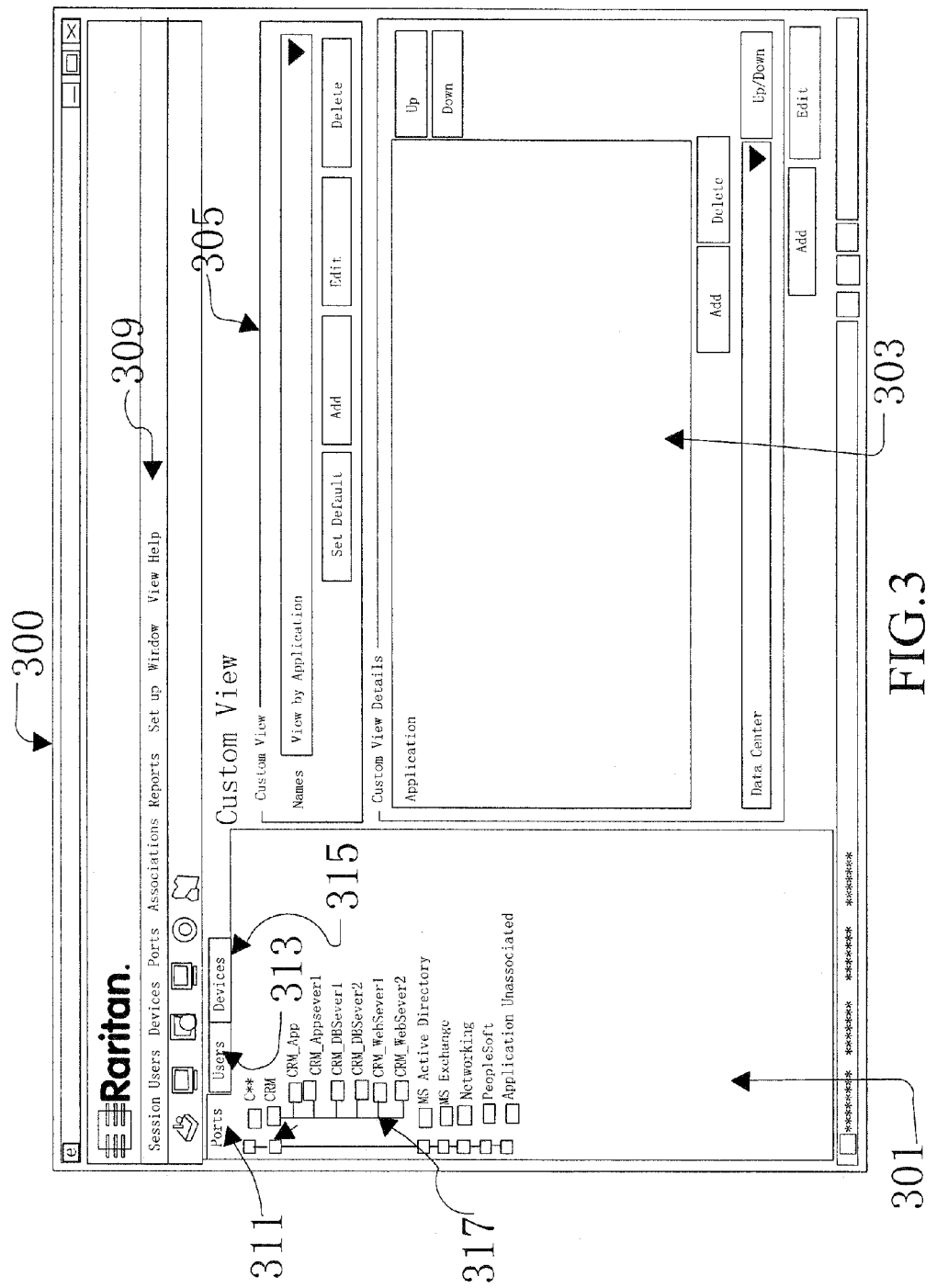
FIG. 3 is a screen-shot of an example option menu used to select any of the remote devices (i.e., networking equipment, servers, computers, etc.) for access and control.

After the user enters his user identification information, the information is transmitted from user workstation 101 to W-RMU 121. W-RMU 121 receives the information and authenticates the user. If the user has provided valid identification information, the user is granted access to an interface which enables the user to view a listing of accessible remote devices. A user may be restricted to only access certain remote devices 141*a-n* or to only perform certain functions, as determined by the identification information If the user at user workstation 101 is authorized to access remote devices 141*a-n*, an interactive option menu is displayed on local video monitor 105, which enables a user to find and select remote devices 141*a-n* for control. FIG. 3 depicts an exemplary option menu 300, although the form and content of the menu can vary without departing from the spirit of the present invention. Option menu 300 comprises device sub-window 301, details sub-window 303, custom-view form 305, and menu bar 309.

Device sub-window 301 displays an organized list of remote devices 141*a-n*. Tabs 311, 313, and 315 enable a user to view the list sorted according to particular criteria. As depicted, list 317 is sorted according to the group associated with each remote device 141*a-n*. Alternatively, list 317 can be sorted according to device name, the user associated with each device, the type of connection to W-RMU (e.g., serial, KVM, power), etc. List 317 is a multi-level, expandable, clickable list that enables a user to quickly find and select a remote device 141*a-n*. Clicking on one of the items in list 317 enables the user to select the associated remote device 141*a-n* for control.

Details sub-window 303 enables a user to view the detailed attributes of one or more remote devices 141*a-n*. For example, the name, group, applications, IP address, status, owner, location, etc., of a device can be viewed in details sub-window 303. Alternatively, a user can search for devices with certain of these attributes, with the results returned to details sub-window 303 (e.g., a user can search for all devices that operate a platform). Similar to list 317, the list of remote devices 141*a-n* displayed on details sub-window 303 is clickable, sort-able, etc. Clicking on one of the items in the list enables the user to select the associated remote device 141*a-n* for control.

The user can choose which attributes to view for a remote device 141*a-n* by interacting with custom view form 305. Specifically, custom view form 305 allows a user to add, edit, or delete the attributes the user wishes to view for a remote device 141*a-n*. Finally, menu bar 309 enables a user to search for a particular remote device, to customize option menu 300, or to request help.

If a user selects a remote device 141*a-n* for KVM control, user workstation 101 sends TCP/IP data with control signals to W-RMU 121. W-RMU 121 interprets the control signals and establishes communications to enable user workstation 101 to communicate with the selected remote device 141*a-n*. Specifically, W-RMU 121 enables bi-directional transmission of keyboard and cursor control device signals, and uni-directional transmission of video signals from the select remote device 141*a-n* to local video monitor 105 of user workstation 101.

Figure 4:
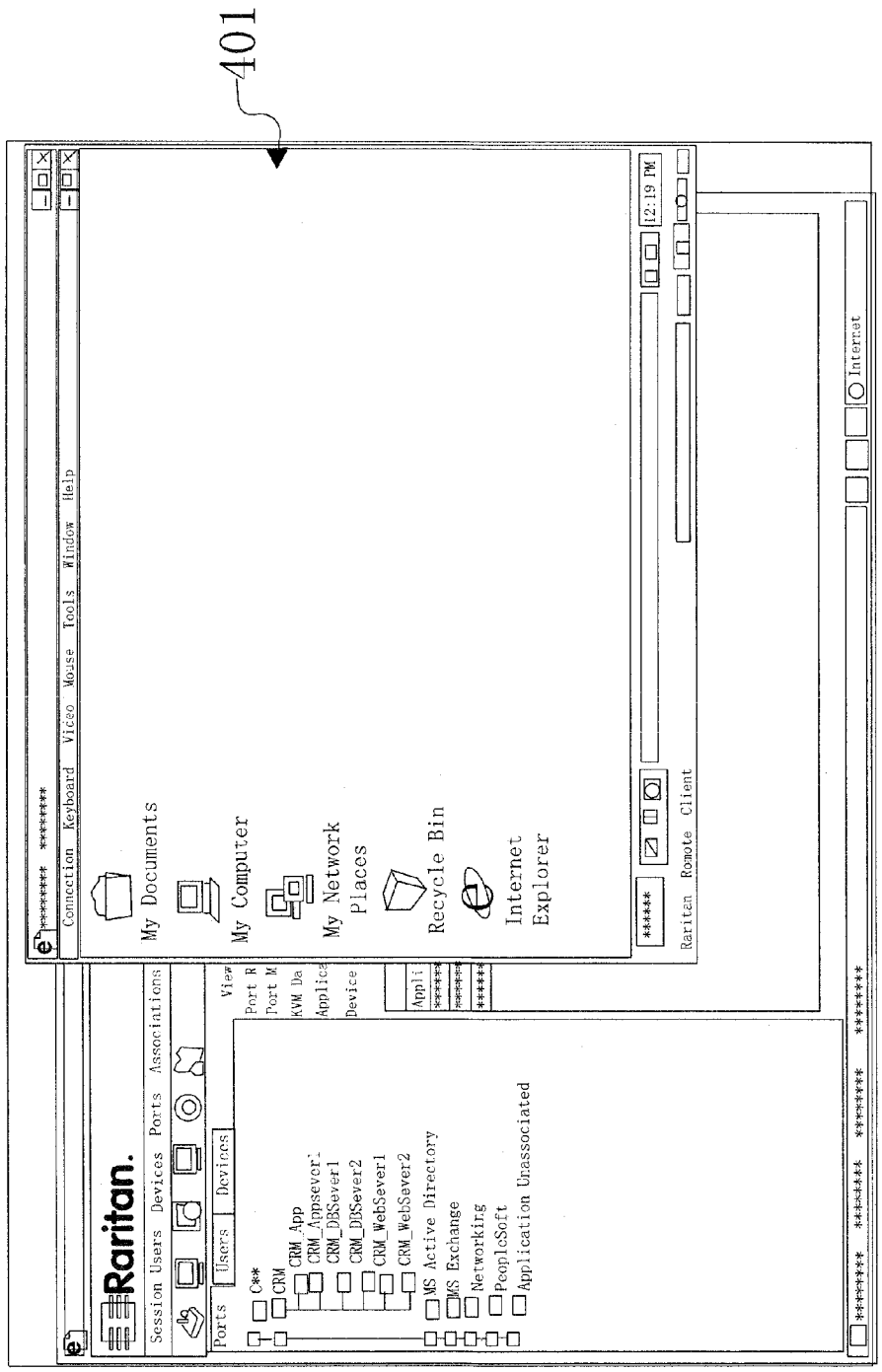
FIG. 4 is a screen-shot of an example interface used to control a remote computer or server via KVM port access.

As depicted in FIG. 4, if a user selects a remote computer or server to monitor and/or control via KVM port access, desktop window 401 from the remote device selected is displayed on local video monitor 105, as shown. Remote desktop window 401 enables a user to remotely monitor, control and interact with any remote device 141*a-n* using local keyboard 103, video monitor 105, and cursor control device 107. At the same time, remote desktop window 401 is updated as new frames of video are received from remote computer 141*a-n*.

As the user operates keyboard 103 and cursor control device 107, user workstation 101 transmits keyboard and cursor control device signals to W-RMU 121 as TCP/IP data. W-RMU 121 receives the TCP/IP data and transmits keyboard and cursor control device signals to the selected remote device 141a-n. In the reverse direction, keyboard and cursor control device signals are transmitted from remote device 141a-n to W-RMU 121 via Z-CIM 153a-n. W-RMU 121 then generates TCP/IP signals which are transmitted to user workstation 101.

The transmission of video signals from a remote device to the user workstation 101 may require additional steps of digitization and compression depending on the format of signals outputted from remote device 141a-n. Video signals are received by KVM Z-CIM 153a-n from the video port of remote computer 141a-n. The video signals are then transmitted via chain 151 to W-RMU 121. W-RMU 121 digitizes, conditions, compresses, and transmits the signals as TCP/IP data to user workstation 101. User workstation 101 receives the video signals, decompresses the signals and displays the signals on local video monitor 105.

Figure 5:
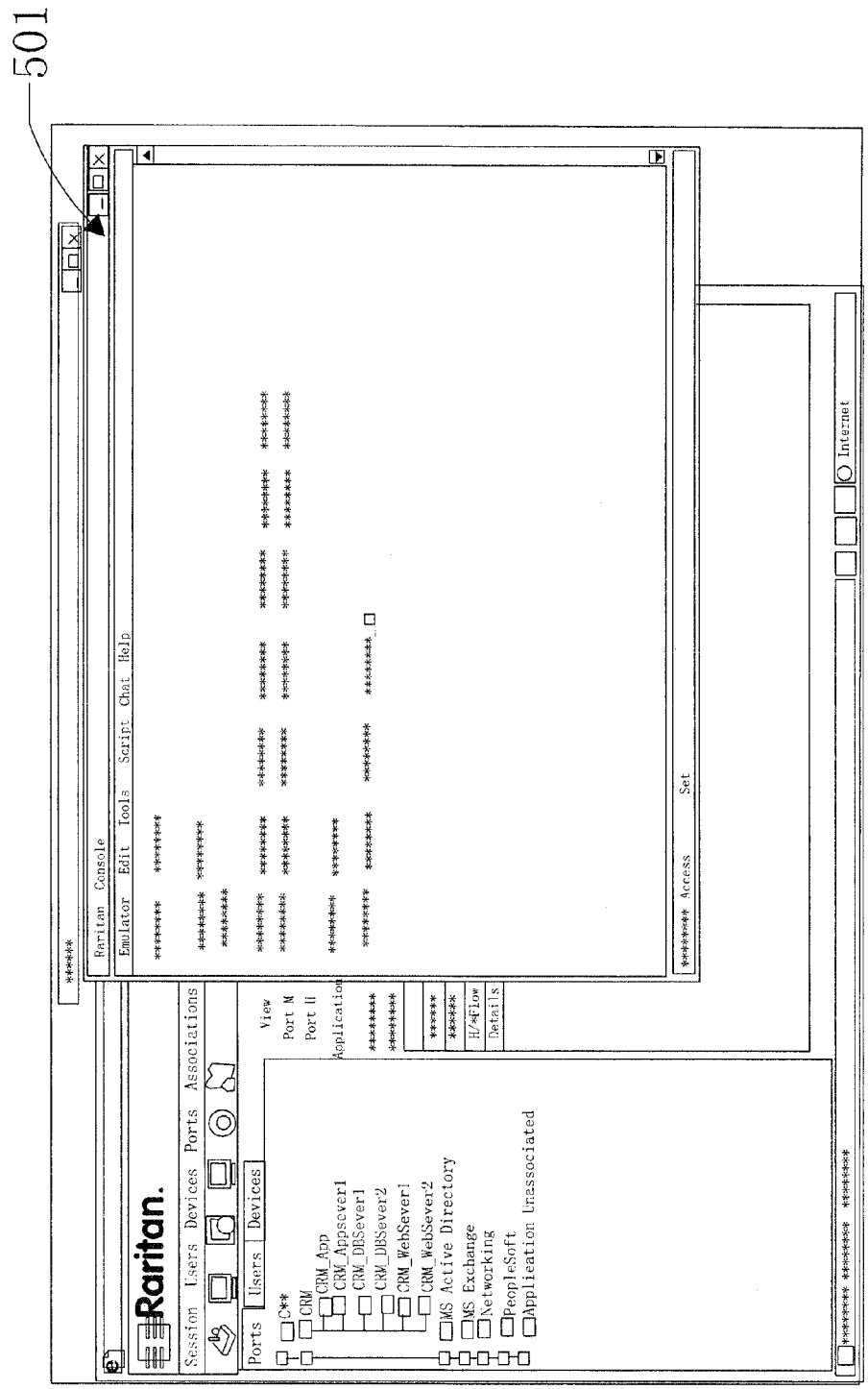
FIG. 5 is a screen-shot of an example interface used to control a remote device via serial port access.

Turning next to FIG. 5, if the user selects to control a remote device 141a-n via serial device access, the user is presented with, for example, terminal window 501 on local monitor 105. The user can enter data using local keyboard 103 and cursor control device 107. User workstation 101 receives this data and transmits it to W-RMU 121 as TCP/IP data. W-RMU 121 receives the TCP/IP data and extracts the information entered by the user. W-RMU 121 then creates serial data from this information which is transmitted to the select remote device 141a-n via that device's serial port connection to Z-CIM 153a-n and the Z-CIM connection to W-RMU 121 via chain 151.

Serial communication is bi-directional, with the serial data also being output by remote device 141a-n. In this direction, the output serial data is transmitted to W-RMU 121 via Z-CIM 153a-n. W-RMU 121 generates TCP/IP data that includes this serial data and transmits the TCP/IP data to user workstation 101 via the wireless or wired network TCP/IP connection. User workstation 101 receives the TCP/IP data, interprets this data, and outputs the data to terminal window 501 on video monitor 105.

The system allows for multiple desktop windows 401 and terminal windows 501 to be open simultaneously. A user can switch between these windows using keyboard 103 or cursor control device 107. This feature enables a user to simultaneously monitor multiple remote devices from one user workstation using a variety of access methods.

Figure 6:
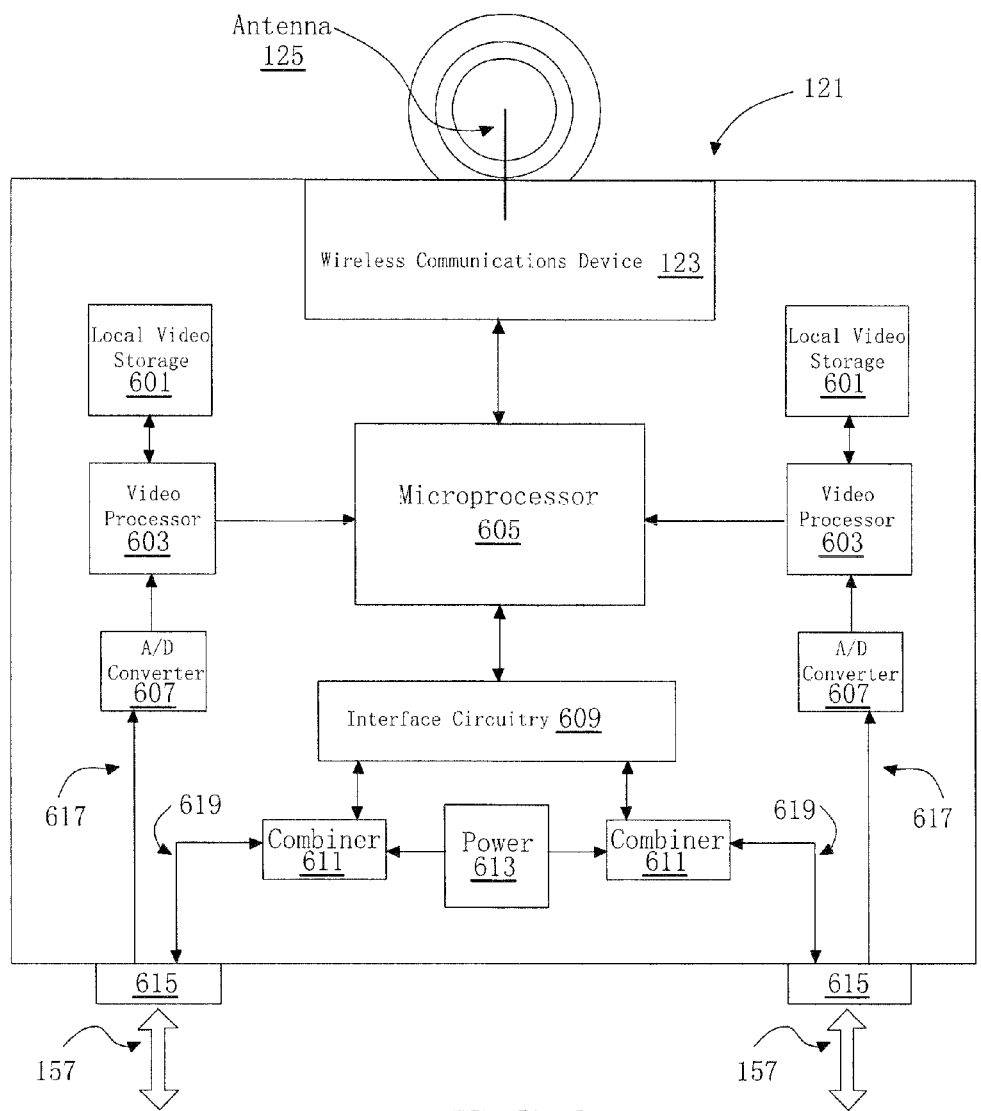
FIG. 6 is a block diagram of the preferred embodiment of the W-RMU shown in FIG. 1 illustrating the internal structure of the W-RMU and connectors for local KVM access and for a chain of Z-CIMs.

Turning next to FIG. 6, depicted is a detailed block diagram of W-RMU 121. Data is transmitted over connections 157, preferably Category 5 ("CAT5") cables. Connections 157 consist of four twisted pairs: three (3) video pairs 617 and one (1) data pair 619. Connections 157 are received at input/output ("I/O") ports 615. Preferably, ports 615 are RJ45 connectors capable or connecting to connections 157. However, I/O ports 615 may be any connectors depending on the cabling type of connections 157. The three (3) unidirectional video pairs 617 are sent to Analog to Digital ("A/D") converter 607, where the video pairs are converted from an analog format to a digital format, if necessary. Next, the video signals are sent to video processor 603 for processing. Preferably, video processor 603 is a Field Programmed Gate Array ("FPGA"), but one of skill in the art will recognize that other types of processors may be utilized without departing from the spirit of the invention. FPGAs have the advantage of being faster than a microprocessor, but are more limited in the logic that they can perform in comparison to other processors. The processed video signals are stored in local video storage units 601. Next, the processed video signals are sent to microprocessor 605 for further processing. As there are two (2) connections 157, two (2) A/D converters 607, two (2) video processors 603, two (2) local video storage units 601 are necessary, one (1) for each connection 157. The same is true for combiners 611.

The fourth twisted pair on connection 157 is bi-directional data pair 619. Each of the data pairs 619 received at I/O ports 615 are sent to combiners 611, where power is multiplexed with each bi-directional data pair. Power module 613 provides power to power W-RMU 121. Each of the combined data signals is then sent to interface circuitry 609. Interface circuitry 609 provides a half duplex connection to Z-CIM chain 151 from W-RMU 121. It provides electrical drivers to the combined data signal. Additionally, interface circuitry 609 provides the appropriate data levels for microprocessor 605. The data signals are sent from interface circuitry 609 to microprocessor 605. Microprocessor 605 combines the data signals from interface circuitry 609 and video signals from video processor 603 into a data packet for transmission to wireless communications device 123. The data packet is then sent to the appropriate user workstations 101 via antenna 125. Alternatively, a network card 127 can be used (not shown in FIG. 6), to send the data packet to the appropriate user workstation 101. Also, a modem can be used.

Wireless communications device 123 also receives signals via antenna 125 from user workstations 101. The signal, containing video and data information, is sent to microprocessor 605. The data packet is separated and the data signals are sent to interface circuitry 609, which provides electrical drivers and the appropriate levels for sending the data to the two combiners 611. Each data pair is then sent to combiners 611 and then to the appropriate Z-CIM 153 via connection 157.

Figure 7:
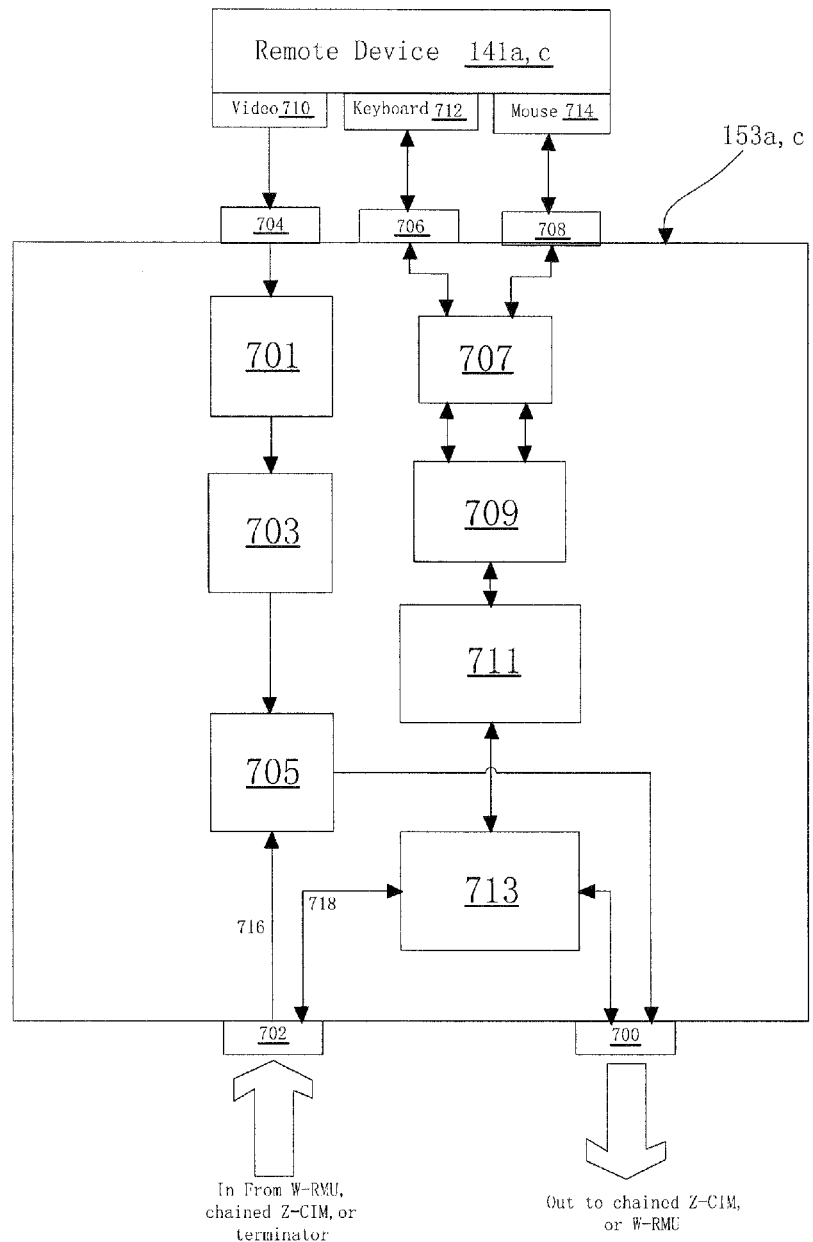
FIG. 7 is a detailed block diagram of a first class of Z-CIM illustrating the internal structure of the Z-CIM and connectors for interfacing with the keyboard port, video monitor port, cursor control device port and power supply of a remote device and for connecting the Z-CIM to other Z-CIMs in a chain.

FIG. 7 depicts a detailed block diagram of a first class of Z-CIM 153a or 153c. Connection 157, preferably CAT5 cabling, contains three (3) unidirectional video pairs 716 and one (1) bi-directional data pair 718. The three (3) unidirectional video pairs 716 are received by Z-CIM 153a or 153c via port 702. In the present embodiment, port 702 is an RJ45 connector for connecting to CAT5 cabling. However, port 702 may be any type of port depending on connection 157 without departing from the spirit of the invention. Port 702 may connect to a terminator, W-RMU 121, or another Z-CIM 153. The three (3) video pairs 716 are sent to relay tree 705, which can switch the video pairs 716 to either side of connection 157.

Remote device 141a,c transmits unidirectional video signals from video port 710 on remote device 141a,c to video port 704 on Z-CIM 153a,c. The video signal from remote device 141a,c is then sent to sync extraction and level insertion circuitry 701. Preferably, circuitry 701 takes the 5-bit video signals (1 for red, 1 for blue, 1 for green, 1 for horizontal sync, and 1 for vertical sync) and combines each of the two (2) sync signals onto a separate color for transmission over CAT5 cabling. Also, a known reference signature voltage is inserted in order to provide automatic gain compensation. The combined video signals are then sent to video driver 703, where the signals are further processed as necessary. Next, the signals are sent to relay tree 705 where they are combined with the appropriate video pair of the aforementioned three (3) unidirectional video pairs 716. Relay tree 705 sends the three (3) combined video pairs, containing information regarding video signals, to port 700. Preferably, port 700 is an RJ45 connector for connecting to CAT5 cabling. However, port 700 may be any type of port depending on connection 157 without departing from the spirit of the invention. Port 700 may be connected to another Z-CIM 153 or to W-RMU 121.

The bi-directional keyboard and cursor control signals from remote device 141a,c are sent to Z-CIM 153a,c from keyboard port 712 and cursor control port 714 on remote device 141a,c to keyboard port 706 and cursor control port 708 on Z-CIM 153a,c, respectively. Interface logic 707 receives the keyboard and cursor control signals and applies the appropriate logic to the signals. The keyboard and cursor control signals are then sent to microprocessor 709, which combines the keyboard and cursor control signals into a data packet. Microprocessor 709 interfaces to remote device's 141a,c keyboard and cursor control lines. The data packet is then sent to interface circuitry 711. Interface circuitry 711 is preferably an RS485 interface, which applies the proper protocol. Interface circuitry 711 bi-directionally communicates with both power extractor 713 and microprocessor 709. Power extractor 713 extracts power from remote device 141a,c via data pair 718 on connection 157 in order to power Z-CIM 153a,c. Additionally, power extractor 713 acts as a multiplexer/de-multiplexer multiplexing the incoming signal from interface circuitry 711 with the data pair. The data pair, now containing keyboard and cursor control information, is sent to another Z-CIM 153. However, if the Z-CIM 153 is the last in the Z-CIM chain, it is then sent to either W-RMU 121 or to a terminator. Z-CIM 153a,c can also receive and convert data from user workstation 101 via W-RMU 121 for transmission to remote device 141a,c.

Figure 8:
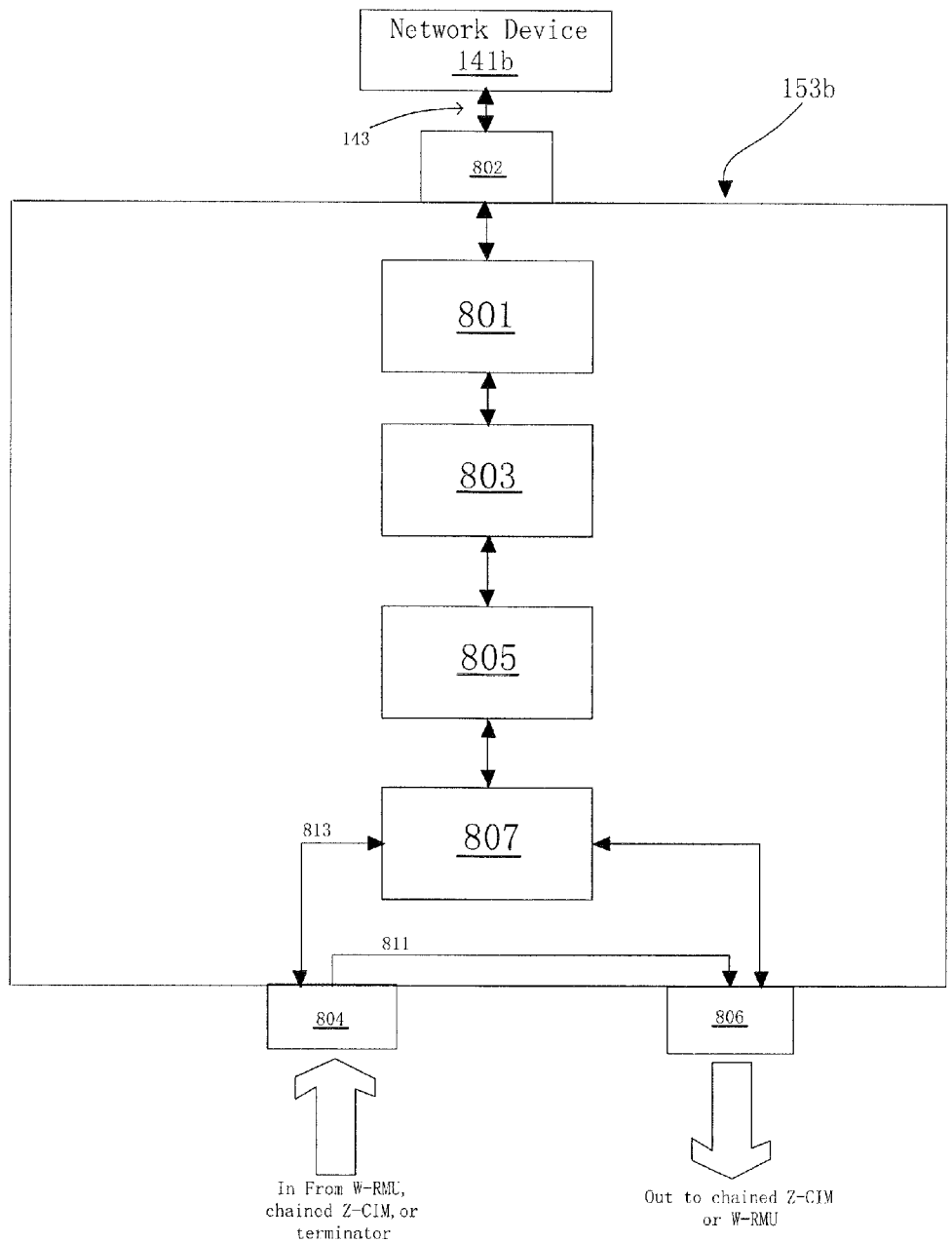
FIG. 8 is a detailed block diagram of a second class of Z-CIM illustrating the internal structure of the Z-CIM and connectors for interfacing with the serial port and power supply of a W-RMU and for connecting the Z-CIM to other Z-CIMs in a chain.

FIG. 8 is a detailed block diagram of a second class of Z-CIM 153b. It is similar to Z-CIM 153a,c in FIG. 7, except that Z-CIM 153b has no video components. As shown in FIG. 8, the video signals 811 received at port 804 pass through Z-CIM 153b. Port 804 is preferably an RJ45 connector. Port 804 may be connected to a terminator, W-RMU 121, or another Z-CIM 153. Network device 141b bi-directionally communicates with Z-CIM 153b over connection 143. Z-CIM 153b sends and receives data via port 802. Preferably, port 802 is an RS232 interface for connecting to a serial RS232 cable. However, port 802 can be any port necessary for connecting Z-CIM 153b to network device 141b. Data received from network device 141b by Z-CIM 153b via port 802 is sent to interface logic 801. Interface logic 801 receives the serial data signals from network device 141b and applies appropriate logic to the signals. The serial data signals are then sent to microprocessor 803, which combines the serial data signals into a data packet. The data packet is then sent to interface circuitry 805. Interface circuitry 805 is preferably an RS485 interface, which applies the proper protocol to the signals. Interface circuitry 805 bi-directionally communicates with both power extractor 807 and microprocessor 803. Power extractor 807 extracts power from the W-RMU via data pair 813 on connection 157 in order to power Z-CIM 153b. Additionally, power extractor 807 acts as a multiplexer/de-multiplexer multiplexing the incoming signal from interface circuitry 805 with data pair 813. The data pair, now containing serial data information, is then sent to another Z-CIM 153 via port 806. Port 806 is preferably an RJ45 connector. Port 806 may be connected to either another Z-CIM 153 or to W-RMU 121. If Z-CIM 153b is the last in the Z-CIM chain, it is then sent to either W-RMU 121 or a terminator. Similarly, Z-CIM 153b can send keyboard and cursor control signals from user workstation 101 via W-RMU 121 to the network device 141b.

While the present invention has been described with reference to the preferred embodiments and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A wireless, multifunction remote device management system comprising:
a user workstation of the type including at least one device selected from the group consisting of a keyboard, a monitor, and a cursor control device;
a plurality of remote devices of a first type each including a KVM interface;
a remote device of a second typed including a serial interface;
a plurality of remote interface modules of a first type each including a KVM interface for connecting to one of the remote devices of the first type;
a remote interface module of a second type including a serial interface for connecting to the remote device of the second type; and
a remote device management unit coupled to said user workstation, said remote interface modules of the first type and said remote interface module of the second type,
wherein said remote interface modules of the first type and said remote interface module of the second type each includes one or more input/output ports for interconnecting with other ones of said remote interface modules of the first type and said remote interface module of the second type,
wherein said remote interface module of the second type is interconnected with one of the remote interface modules of the first type, and
wherein said remote interface modules of the first type, said remote interface module of the second type and said remote device management unit are interconnected to one another in a chain-like configuration.

2. The wireless, multifunction remote device management system according to claim 1, wherein said remote device management unit bi-directionally communicates with said user workstation over a wireless network.

3. The wireless, multifunction remote device management system according to claim 1, wherein said remote devices of said first and second remote device types bi-directionally communicate with said remote interface modules of said first and second types, respectively.

4. The wireless, multifunction remote device management system according to claim 1, wherein said remote devices of first and second types of remote interface modules bi-directionally communicate with said remote device management unit.

5. The wireless, multifunction remote device management system according to claim 1, wherein a first one of said remote interface modules in said chain-like configuration is connected to said remote device management unit.

6. The wireless, multifunction remote device management system according to claim 1, wherein a last one of said remote interface modules in said chain-like configuration is connected to either said remote device management unit or a terminator.

7. The wireless, multifunction remote device management system according to claim 6, wherein said terminator connects to said last one of said remote interface modules to complete the connections of said remote devices with said remote device management unit.

8. The wireless, multifunction remote device management system according to claim 1, wherein said of remote interface modules of said first type are each configured to connect to a remote device with video.

9. The wireless, multifunction remote device management system according to claim 1, wherein said remote interface modules of said first type are each powered by one of said first type of remote devices.

10. The wireless, multifunction remote device management system according to claim 1, wherein said second type of remote interface module connects to a remote device without video.

11. The wireless, multifunction remote device management system according to claim 1, wherein said second type of remote interface module is powered by said remote device management unit.

12. The wireless, multifunction remote device management system according to claim 1, wherein a user may control a plurality of said remote devices at one time.

13. The wireless, multifunction remote device management system according to claim 1, wherein said system is platform independent.

14. The wireless, multifunction remote device management system according to claim 1, wherein said system is upgradeable.

15. The wireless, multifunction remote device management system according to claim 1, wherein said system enables power supply control of at least one of said remote devices from said user workstation.

16. The wireless, multifunction remote device management system according to claim 1, wherein:
each of said remote interface modules of the first type includes two input/output ports;
one of the two input/output ports comprises an input port that connects to one of said remote device management unit, another remote interface module, or a terminator;
the other one of said pair input/output ports comprises an output port; and
said KVM interface of said remote interface module of said first type comprises connections for receiving video output of a remote device, for sending and receiving keyboard signals from said remote device, and for sending and receiving cursor control signals from said remote device; and
each remote interface module of said first type comprises circuitry for power control, sending and receiving signals, signal conversion, and storage.

17. The wireless, multifunction remote device management system according to claim 16, wherein said input port receives video and data signals.

18. The wireless, multifunction remote device management system according to claim 16, wherein said circuitry converts and combines said video output with said video signals received by said input port for transmission.

19. The wireless, multifunction remote device management system according to claim 16, wherein said circuitry combines said keyboard signals and said cursor control signals into a data packet.

20. The wireless, multifunction remote device management system according to claim 19, wherein said data signal received at said input port is combined with said data packet by said circuitry for transmission.

21. The wireless, multifunction remote device management system according to claim 1, wherein each of said remote interface modules of said first type bi-directionally communicates with one of said remote devices f said first type and said remote device management unit.

22. wireless, multifunction remote device management The system according to claim 1, wherein said remote device management unit bi-directionally communicates with said user workstation over a wireless network.

23. The wireless, multifunction remote device management system according to claim 1, wherein:
said remote interface module of the second type includes two input/output ports;
one of said input/output ports comprises an input port that connects to one of said remote device management unit, another remote interface module, or a terminator;
the other one of said input/output ports comprises an output port that connects to one of another remote interface module, or said remote device management unit;
said serial interface of said remote interface module of said second type comprises connections for sending and receiving serial signals from a remote device; and
said remote interface module of said second type comprises circuitry for power control, sending and receiving signals, signal conversion, and storage.

24. The wireless, multifunction remote device management system according to claim 23, wherein said input port receives video and data signals.

25. The wireless, multifunction remote device management system according to claim 24, wherein said video signals pass directly through said second type of remote interface modules.

26. The wireless, multifunction remote device management system according to claim 23, wherein said circuitry converts said serial signals into a data packet.

27. The wireless, multifunction remote device management system according to claim 1, wherein said remote interface module of said second type is configured to communicate bi-directionally with said remote device of said second type and remote device management unit.

* * * * *

UNITED STATES PATENT AND TRADEMARK OFFICE
CERTIFICATE OF CORRECTION

PATENT NO. : 8,281,040 B2  
APPLICATION NO. : 12/881255  
DATED : October 2, 2012  
INVENTOR(S) : David Hoerl and John T. Burgess Page 1 of 1

It is certified that error appears in the above-identified patent and that said Letters Patent is hereby corrected as shown below:

On Title Page 1, in element [73], the name of the assignee should read "RIIP, Inc." instead of "RIP, Inc."

Signed and Sealed this  
Twelfth Day of February, 2013

Teresa Stanek Rea  
*Acting Director of the United States Patent and Trademark Office*